H. RICHARDSON.
FEED GATE FOR WEIGHING MACHINES.
APPLICATION FILED SEPT. 9, 1908.

935,689.

Patented Oct. 5, 1909.
2 SHEETS—SHEET 1.

Witnesses:

Inventor
Henry Richardson
By James L. Norris
Atty.

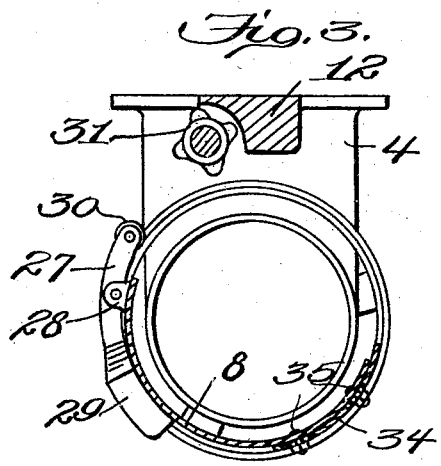
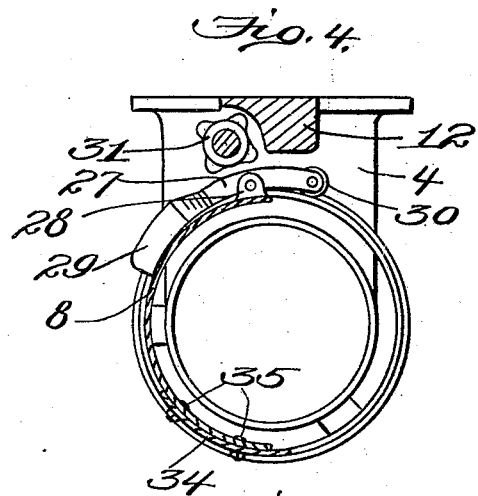
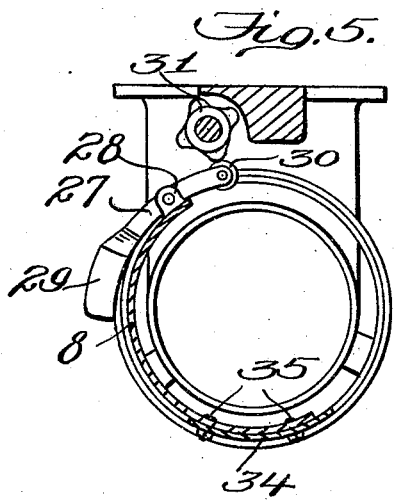
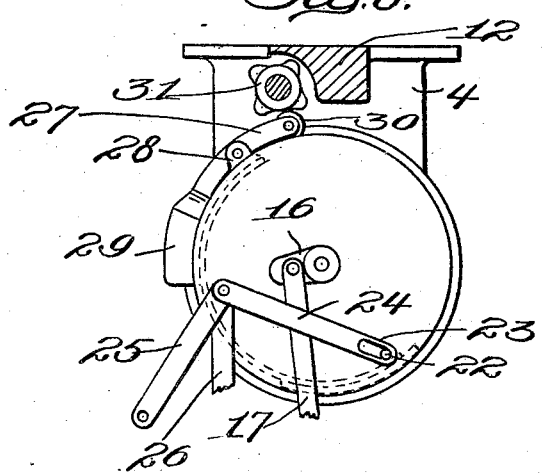
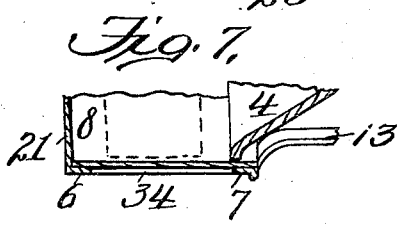

UNITED STATES PATENT OFFICE.

HENRY RICHARDSON, OF NEW YORK, N. Y.

FEED-GATE FOR WEIGHING-MACHINES.

935,689.      Specification of Letters Patent.      Patented Oct. 5, 1909.

Application filed September 9, 1908. Serial No. 452,268.

*To all whom it may concern:*

Be it known that I, HENRY RICHARDSON, a subject of the King of Great Britain, residing at New York, in the county of New York and State of New York, have invented new and useful Improvements in Feed-Gates for Weighing-Machines, of which the following is a specification.

My present invention relates to improvements in means for feeding material to scales or weighing machines, and it has for its object to provide an improved gate of this character which is preferably rotatable and is controlled automatically by the scale mechanism, the gate being so constructed that the material in entering the same lies therein in such a manner as to offer a minimum friction or resistance to its turning, the gate being consequently easy to operate and thereby requiring slight power only from the scale beam.

Another object of the invention is to provide a novel and improved tapper, shaker or agitating device which is arranged in coöperative relation with the gate and has means for automatically setting it in operation to vibrate or otherwise agitate the gate while the latter occupies a predetermined position, such for instance as the dribble position, so that a proper flow of the material from the gate is insured even though the material being fed may be lumpy or of a consistency otherwise difficult to handle.

To these and other ends the invention consists in certain improvements and combinations and arrangements of parts all as will be hereinafter more fully described, the novel features being pointed out particularly in the claims at the end of the specification.

Figure 1:
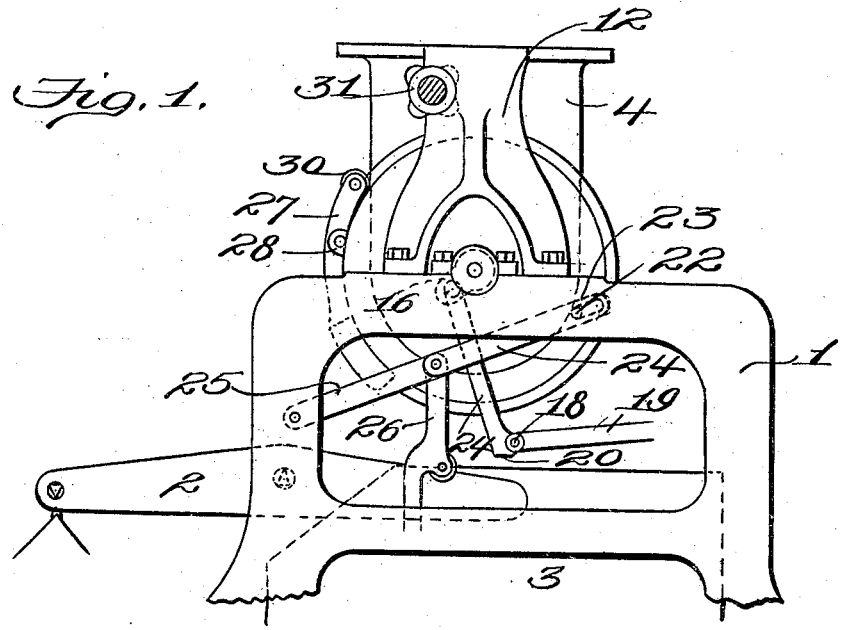
Figure 2:
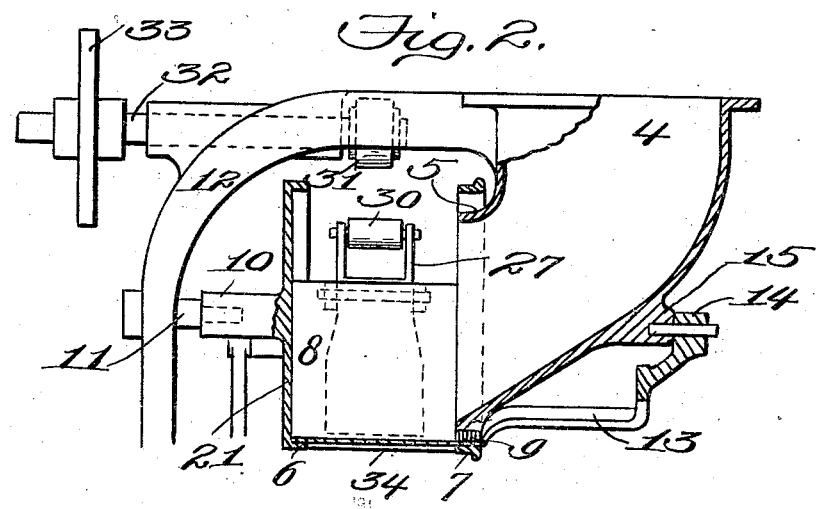

In the accompanying drawings: Figure 1 is a side elevation of a portion of a weighing machine equipped with an automatic feed gate constructed in accordance with my present invention. Fig. 2 represents an axial section through the feed gate, the latter being shown in closed position or in the position indicated in Fig. 1. Fig. 3 represents a transverse section through the gate, the latter being shown in closed position. Fig. 4 is a view similar to Fig. 3, showing the gate fully open. Figs. 5 and 6 represent respectively a transverse section and an end elevation of the gate, the gate being shown in dribble position and the tapper or shaker being shown in operative position. Fig. 7 represents a sectional view of portions of the feed hopper and gate, the brush for preventing leakage between these parts being omitted.

Similar parts are designated by the same reference characters in the several views.

Feed gates constructed in accordance with my present invention are capable of use generally in connection with scales or weighing machines of various types and also in connection with other apparatus wherein it is desirable to closely regulate or control the flow of material, and in the accompanying drawings I have shown the improved gate as applied to a weighing machine or scale. It will be understood, however, that the drawings show merely one specific embodiment of the invention and that the same is not necessarily so limited, as certain modifications or changes in the details of construction of the parts or in the relative arrangement thereof may be made in applying the invention in each particular case.

In the present instance, 1 designates the frame of a scale or weighing machine which may be of any appropriate type, the same being provided with the usual scale beam 2 and with a weigh hopper 3. These parts are not involved in the present improvements and are therefore merely indicated conventionally. On the top of the frame is mounted a feed hopper 4 above which may be arranged a chute or other means for conducting the material thereto. While this feed hopper may be of different constructions, I preferably employ one such as that shown wherein the inlet portion is substantially vertical and the outlet of the hopper is arranged at an incline, the angle of inclination being varied, if so desired, according to the nature of the material to be handled, whereby a proper flow of the material into the gate may be insured. This discharge end of the feed chute is formed preferably with an annular flange 5.

The feed gate is mounted to receive the material from the hopper and in the present instance this gate is composed of a pair of rings 6 and 7 which are preferably circular in form, and connecting these rings is a curved plate 8, this plate being secured to the rings and is in substantially the form of a semicylinder. The ring 7 surrounds and forms a suitable joint with the flange 5 of the feed hopper. In some cases this ring and flange may directly coöperate to form the joint as shown in Fig. 7, while in some cases, such for instance as in the handling of grain, a brush 9 may be interposed between these parts so as to provide a relatively tight joint to prevent leakage of the material between the gate and feed hopper. The ring 6 is provided with a hub 10 which is supported by a bearing 11 supported on a frame 12, while the ring 7 is provided with a cradle arm 13 which extends around the lower portion of the feed hopper and is provided with a bearing arm 14 which coöperates with a bearing 15 formed at the rear under side of the hopper, the bearings 11 and 15 being arranged in alinement. The hub 10 of the gate is provided with a crank 16 to which is pivotally attached a pendant 17, the lower portion of the latter being pivotally attached at 18 to a link 19 which may be attached to a suitable part of the scale beam, and the lower end of the pendant is formed with a heel 20 which is adapted to be engaged by the scale beam as the load receiving side thereof rises, this motion taking place after the weigh hopper has discharged a load. That portion of the gate carrying the ring 6 forms an end wall 21 for the gate, this end wall being arranged opposite to the discharge opening of the feed hopper, and in practice the distance of this end wall of the gate from the feed hopper may be varied according to the nature of the material to be handled. This end wall is provided at its outer side with a pin 22 which operates in the slotted end 23 of a toggle link 24, this toggle link coöperating with a complemental link 25, and the middle joint of these links is pivotally attached to a toggle breaking member 26.

In order to insure a proper discharge of the material from the gate, a tapper or shaker is provided, this tapper or shaker being provided with means whereby it will be inoperative under certain conditions, such for instance as when the gate is in closed position, and as the gate opens to a predetermined position, such for instance as the dribble position, this tapper will be set automatically into operation. While it is possible to employ tappers of various forms and to use different means for controlling and operating the same, I have shown in the accompanying drawings one particular form of tapper or shaker, which comprises a lever 27 which is pivoted at an intermediate point to the rear side of the segmental plate 8 of the gate by means of a bracket 28, the lower portion of this lever being provided with a knocking weight 29 while its opposite or upper end is provided with a roller or projection 30. An operating wheel 31 is mounted on a shaft 32 journaled in the gate supporting frame 12, and this wheel is provided on its periphery with a suitable number of projections. The shaft 32 is provided with a pulley or wheel 33 for imparting continuous motion thereto, and as the gate swings into a predetermined position, preferably the dribble position, the roller 30 of the tapper will be brought into a position to coöperate with this operating wheel and as the projections thereon successively engage the roller, it will vibrate the tapper. It is to be observed that this tapper, when the gate is in open position, will strike the rear side of the segmental plate 8 upon which the material is supported; and this tapping or knocking action will serve to loosen the material and cause it to flow evenly over the lower edge of the gate.

In Figs. 1, 2 and 3, the gate is shown in closed position, the toggle serving to lock the gate to prevent accidental opening thereof. As the material is fed into the feed hopper, it will flow at a certain angle, determined according to the consistency of the material, and it is desirable in practice to so space the end wall of the gate from the discharge end of the hopper that the apex of the material will just reach the bottom of this wall. After a load has been discharged from the weigh hopper 3, the load receiving end of the scale beam 2 will rise, this rising movement of the scale beam first lifting the toggle breaking member 26 so as to break the toggle and unlock the gate, and a further movement of the scale beam in this direction will strike the heel 20 of the pendant and thereby raise the same, the pendant in turn coöperating with the crank 16 to turn the gate into fully open position as indicated in Fig. 4. While the gate is in this position, the upper and lower edges of the semicylindrical plate 8 of the gate will be substantially vertical so that a full discharge of the material from the feed hopper into the weigh hopper may take place. As the weigh hopper settles down under the weight of the material flowing into the same, the pendant will settle therewith, causing the gate to be turned into the dribble position as shown in Figs. 5 and 6. The gate when in this position is partially closed so as to permit a limited flow of the material into the weigh hopper, the lower edge of the curved plate 8 of the gate having moved upwardly from its perpendicular position. When the gate is in this position the roller 30 of the tapper will be opposite to the actuating wheel 31, and as the latter rotates continuously, it will impart a series of vibratory movements to the tapper, and the knocking action produced by the weight 29 thereof at the rear and under side of the curved plate 8 of the gate will serve to loosen the material and cause an even flow of the material from the lower edge of the gate. When a full charge has been supplied to the weigh hopper, the scale beam will, of course, tilt farther, releasing the pendant and the toggle unlocking member 26 and permitting the gate to swing into closed position and to be locked by the toggle. The cycle of operations just described is repeated in the weighing of each charge of material.

By constructing the feed gate of a cylindrical or semicylindrical form as described, the bottom of the gate is horizontal, or substantially so, and by feeding the material thereto in an axial direction and so adjusting the position of the end wall of the gate relatively to the discharge end of the feed hopper as to permit a flow of the material into the gate at such an angle that the extreme forward end of the slope just reaches this end wall, the resistance to the turning of the gate is reduced to a minimum, as there is practically no friction of the material against the end wall of the gate, the material being permitted to flow out of the hopper into the gate in its natural course and is only restricted by the bottom or supporting plate of the gate.

It will be understood, of course, that I contemplate adjusting the end wall of the gate at different distances from the outlet of the hopper according to the consistency of the material to be handled.

In handling materials of different kinds, such for instance, as bituminous or soft coal, and anthracite coal, the flow of the material varies, and in order to enable the dribble of the different materials from the gate into the weigh hopper to be properly governed, an adjustable section or lip may be provided on the discharge edge of the bottom plate 8 of the gate, a plate 34 being applied in the present instance, which plate is adjustable relatively to this discharge edge of the gate, such plate being provided with suitable means for permitting this adjustment, such plate being slotted in the present instance and bolts 35 being employed for securing the plate 34 in the different adjusted positions relatively to the discharge edge of the bottom plate 8. Such a construction enables the flow of material from the gate, while in a dribble position, into the weigh hopper, to be properly governed according to the feed of the material being handled.

The tapper or agitating device for the gate is so arranged as to produce a knocking action against the rear and upper side of the gate, thereby loosening the material and causing an even discharge thereof from the gate. This tapper may be so adjusted as to operate upon the gate while the latter occupies different positions, it being shown in the present instance as arranged to operate while the gate occupies the dribble position, and in either case the tapper and its operating means are so arranged as to automatically operate as the gate swings into the selected position.

What is claimed as new, is:

1. An automatic feed for weighing machines comprising a rotatable gate having a wall at one end thereof, and means for producing a flow of material into the gate in a direction toward said end wall.

2. An automatic feed for weighing machines comprising a rotatably mounted gate having a transversely curved bottom and a wall at one end thereof, and means for supplying material to the gate so as to slope toward said end wall.

3. A feed mechanism for weighing machines comprising a rotatable gate having a cylindrical bottom and a wall at one end thereof, and means for producing a flow of material into the gate in a direction toward said end wall.

4. A feed mechanism for weighing machines comprising a rotatable gate having a semicylindrical bottom and a wall at one end thereof, and means arranged at the opposite end of the gate for supplying material thereto.

5. A feed mechanism for weighing machines comprising a rotatable gate having a transversely curved bottom and provided with a wall at one end, and means arranged at the opposite end of the gate for supplying material thereto in an axial direction and toward said end wall.

6. A feed mechanism for weighing machines comprising a rotatable gate having a transversely curved segmental bottom, a feed hopper having an outlet discharging into the gate for supplying material thereto in an axial direction, and means for turning the gate to discharge the material therefrom.

7. A feed mechanism for machines of the class described, comprising a rotatable gate having a transversely curved segmental bottom and a wall at one end thereof, a feed hopper having an outlet extending into the gate opposite to said end wall, and means for rotating the gate to discharge the material therefrom.

8. Feed mechanism for weighing machines comprising a rotatable gate having a segmental bottom concentric with its axis and having a wall at its opposite end, the end of the gate opposite to said wall being open, a feed hopper having an outlet extending into said open end of the gate, and means operable by the scale mechanism for turning the gate to discharge the material therefrom.

9. Feed mechanism for weighing machines comprising a movable gate, and an agitator coöperative therewith and having means for setting it into operation automatically when the gate is moved into a predetermined position.

10. Feed mechanism for machines of the class described, comprising a pivotally mounted gate having means for supplying material thereto, and an agitator coöperative with the gate and having means for automatically setting it into operation while the gate is in a position to discharge material therefrom.

11. Feed mechanism for weighing machines comprising a pivotally mounted gate having means for supplying material thereto, a tapper mounted to move with the gate and to coöperate therewith, and means for setting the tapper into operation automatically when the gate is moved into a predetermined position.

12. Feed mechanism for weighing machines comprising a pivotally mounted gate having a transversely curved segmental bottom, means for supplying material to the gate, a tapper mounted to direct the segmental bottom of the gate, and means for automatically setting the tapper into operation when the gate is moved into a predetermined position.

13. Feed mechanism for weighing machines comprising a pivoted gate having a semicylindrical concentric bottom, a tapper pivotally mounted upon the gate and arranged to strike the segmental bottom thereof, and a relatively fixed actuating device arranged to coöperate with the tapper as the gate is moved into a predetermined position.

14. Feed mechanism for weighing machines comprising a movably mounted gate adapted to receive and discharge material, a tapper movable with the gate and adapted to coöperate therewith to facilitate the discharge of material therefrom, and a continuously rotating device having projections to coöperate with said tapper whereby the latter is automatically set into operation as the gate is turned into a predetermined position.

15. An automatic feed for weighing machines comprising a rotatably mounted gate having a bottom plate provided with an edge over which the material is adapted to discharge, the position of said edge being adjustable according to the nature of the material being handled.

16. A feed mechanism for weighing machines comprising a rotatably mounted gate having a transversely curved bottom provided with an edge over which the material is adapted to discharge, and a controlling plate adjustable relatively to the said discharge edge of the gate for governing the dribble of the material therefrom.

In testimony whereof I have hereunto set my hand in presence of two subscribing witnesses.

HENRY RICHARDSON.

Witnesses:
WILLIAM A. SHAFER,
LEAH E. NAUMAN.